June 11, 1929.  E. STEADWELL  1,717,273
CONTROL APPARATUS
Filed March 18, 1927
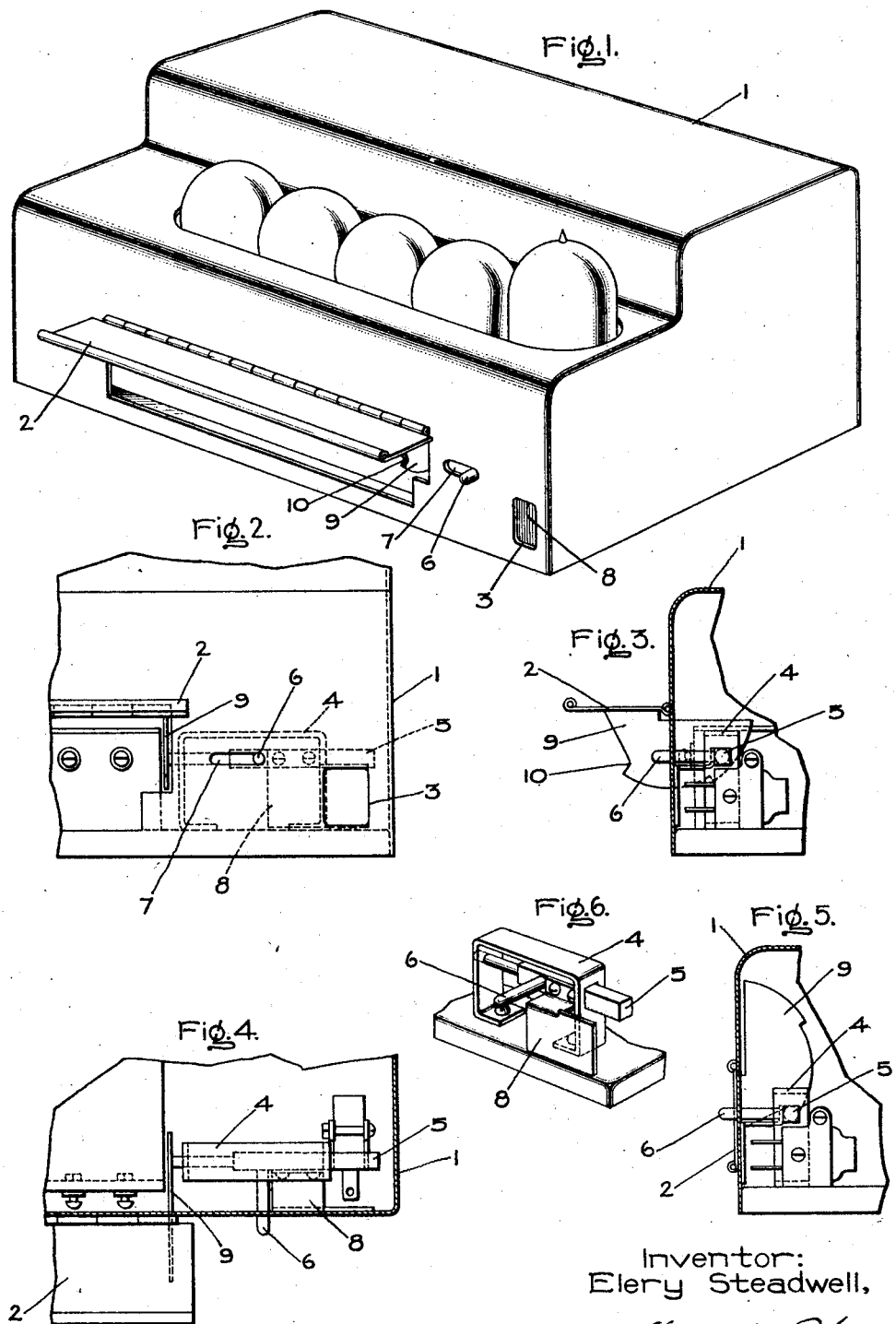
Inventor:
Elery Steadwell,
by *Alexander S. _____*
His Attorney.

Patented June 11, 1929.

1,717,273

UNITED STATES PATENT OFFICE.

ELERY STEADWELL, OF SCOTIA, NEW YORK, ASSIGNOR TO GENERAL ELECTRIC COMPANY, A CORPORATION OF NEW YORK.

CONTROL APPARATUS.

Application filed March 18, 1927. Serial No. 176,555.

My invention relates to apparatus for controlling the energization of an electrical device mounted within a casing, and has for its principal object the provision of an improved control apparatus whereby such a device is always deenergized when it is exposed by opening of the casing.

My invention will be better understood from the following description when considered in connection with the accompanying drawings and its scope will be pointed out in the appended claim.

Referring to the drawings, Fig. 1 is a perspective view of a portion of a radio set wherein my invention has been embodied; Fig. 2 is a partial front elevation of this set; and Figs. 3 to 6 illustrate various details of the control apparatus.

Fig. 1 shows a casing which encloses an electrical device comprising a terminal board (not shown) arranged to be exposed by opening of a door or cover 2. Power is supplied to the device through a plug which is inserted through an opening 3 in the casing 1. In order to prevent injury from contact, a control apparatus is arranged to lock the door 2 in its closed position when the opening 3 is uncovered to permit insertion of the power supply plug and to cover the opening 3 when the door 2 is open to permit inspection, adjustment or repair of the enclosed device.

The control apparatus comprises a support 4 mounted on a wall of the casing 1 and a shaft 5 which extends through openings in the opposite end portions of the member 4, is square at one end and round at the other, is provided with a control member 6 arranged to extend through a slot 7 in the casing 1, and is provided with a shutter 8 mounted on it in a manner to limit its movement to the right.

Attached to the cover 2 is a cam-shaped member 9 which prevents movement of the shaft 5 to the left and maintains the cover over the opening 3 when the cover 2 is open. The cam-shaped member 9 is provided with a projecting portion 10 which is engaged by the end of the shaft 5 thereby maintaining the cover 2 in its closed position when the shaft 5 is moved to the left and the shutter 8 is removed from the plug opening as shown in Fig. 2. This arrangement ensures that the electrical device mounted within the casing 1 is always deenergized when it is exposed by opening of the cover 2, and permits inspection, adjustment and repair of the device without the danger of electrical shock.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:

The combination of a casing provided with a cover and with an opening arranged to permit the completion of an electrical connection, a shaft arranged to be reciprocated and provided with a control member extending through a slot in the wall of said casing, a shutter mounted on said shaft and arranged to cover said opening when said shaft is moved in one direction, and a member mounted on said cover and provided with a projecting portion whereby said cover is locked in its closed position when said shaft is moved in the oppoiste direction.

In witness whereof, I have hereunto set my hand this 16th day of March, 1927.

ELERY STEADWELL.